(12) United States Patent
Nowitzki et al.

(10) Patent No.: US 11,994,003 B2
(45) Date of Patent: May 28, 2024

(54) FALLBACK PREVENTION VALVE APPARATUS, SYSTEM AND METHOD

(71) Applicant: Halliburton Energy Services, Inc., Houston, TX (US)

(72) Inventors: Wesley John Nowitzki, Tulsa, OK (US); Walter Russell Dinkins, Tulsa, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/498,725

(22) Filed: Oct. 11, 2021

(65) Prior Publication Data

US 2022/0025738 A1 Jan. 27, 2022

Related U.S. Application Data

(63) Continuation of application No. 16/486,806, filed as application No. PCT/US2018/033787 on May 22, 2018, now Pat. No. 11,220,885.

(Continued)

(51) Int. Cl.
*E21B 43/12* (2006.01)
*E21B 34/08* (2006.01)
(Continued)

(52) U.S. Cl.
CPC ............ *E21B 34/08* (2013.01); *E21B 43/128* (2013.01); *F16K 3/085* (2013.01); *F04D 1/06* (2013.01);
(Continued)

(58) Field of Classification Search
None
See application file for complete search history.

(56) References Cited

U.S. PATENT DOCUMENTS 3,764,968 A * 10/1973 Anderson ............... E21B 47/18
367/84
3,764,969 A * 10/1973 Cubberly, Jr. .......... E21B 47/18
175/232
(Continued)

FOREIGN PATENT DOCUMENTS

| CN | 2756816 Y | * | 2/2006 | |
| CN | 103883757 A | * | 6/2014 | .......... F16K 11/0746 |
| WO | 2013119194 A1 | | 8/2013 | |

OTHER PUBLICATIONS

Machine Translation of CN 2756816 (Obtained from USPTO Search 2022 Clarivate Analytics) (Year: 2022).*

(Continued)

*Primary Examiner* — Essama Omgba
*Assistant Examiner* — Geoffrey S Lee
(74) *Attorney, Agent, or Firm* — Barnes & Thornburg LLP

(57) ABSTRACT

A fallback prevention valve apparatus, system and method is described. An electric submersible pump (ESP) fallback prevention system includes an ESP assembly positioned in a downhole well, the ESP assembly including production tubing extending between a centrifugal pump and a surface of the downhole well such that during operation of the ESP assembly production fluid flows upward from the centrifugal pump through the production tubing to the surface, the production tubing including a fallback valve actuatable by the flow of production fluid, the fallback valve actuatable between an open position, wherein production fluid flowing upward through the fallback valve actuates the fallback valve into the open position, and a closed position, wherein production fluid flowing downward through the fallback valve actuates the fallback valve into the closed position, the (Continued)

closed position blocking sand carried by the production fluid from falling into the centrifugal pump.

18 Claims, 11 Drawing Sheets

Related U.S. Application Data

(60) Provisional application No. 62/524,249, filed on Jun. 23, 2017.

(51) Int. Cl.
    *F04D 13/10*     (2006.01)
    *F04D 15/00*     (2006.01)
    *F04D 15/02*     (2006.01)
    *F16K 3/08*     (2006.01)
    *F04D 1/06*     (2006.01)

(52) U.S. Cl.
    CPC .......... *F04D 13/10* (2013.01); *F04D 15/0005* (2013.01); *F04D 15/02* (2013.01)

(56) References Cited

U.S. PATENT DOCUMENTS

| | | | |
|---|---|---|---|
| 5,662,167 A * | 9/1997 | Patterson | B01D 21/0003 166/105.1 |
| 5,787,052 A * | 7/1998 | Gardner | E21B 47/18 367/148 |
| 6,219,301 B1 * | 4/2001 | Moriarty | E21B 47/18 340/854.3 |
| 6,289,990 B1 * | 9/2001 | Dillon | F16K 17/19 166/373 |
| 8,281,866 B2 * | 10/2012 | Tessier | E21B 34/08 137/107 |
| 9,562,418 B2 * | 2/2017 | Osborne | F16K 17/26 |
| 10,781,662 B2 * | 9/2020 | Andersson | E21B 34/08 |
| 2013/0277119 A1 | 10/2013 | Rogers et al. | |
| 2014/0014358 A1 * | 1/2014 | Leitch | E21B 43/08 166/105.4 |
| 2014/0014866 A1 | 1/2014 | Isenhour et al. | |
| 2014/0334953 A1 | 11/2014 | Parmeter et al. | |
| 2015/0234391 A1 | 8/2015 | Sabadin | |
| 2015/0308434 A1 | 10/2015 | Crane et al. | |
| 2016/0348471 A1 * | 12/2016 | Kenney | E21B 43/121 |

OTHER PUBLICATIONS

Machine Translation of CN 103883757 (Obtained from USPTO Search) (Year: 2024).*
International Search Report & Written Opinion in PCT/US2018/033787, dated Sep. 13, 2018.

* cited by examiner

FALLBACK PREVENTION VALVE APPARATUS, SYSTEM AND METHOD

CROSS-REFERENCE TO RELATED APPLICATIONS

This application is a Continuation application of U.S. application Ser. No. 16/486,806 filed Aug. 16, 2019, which is a national stage application of PCT/US2018/033787 filed May 22, 2018, which claims the benefit of and priority to U.S. Provisional Application No. 62/524,249 filed Jun. 23, 2017, the disclosures of which are incorporated by reference herein in their entirety.

BACKGROUND

Field of the Invention

Embodiments of the invention described herein pertain to the field of valves for electric submersible pump production tubing. More particularly, but not by way of limitation, one or more embodiments of the invention enable a fallback prevention valve apparatus, system and method.

Description of the Related Art

Fluid, such as gas, oil or water, is often located in underground formations. When pressure within the well is not enough to force fluid out of the well, the fluid must be pumped to the surface so that it can be collected, separated, refined, distributed and/or sold. Centrifugal pumps are typically used in electric submersible pump (ESP) applications for lifting well fluid to the surface.

In ESP assemblies, production tubing extends from the pump discharge to a well head on the surface. The production tubing allows delivery of well fluid from the centrifugal pump to surface facilities. During operation of the pump, a column of fluid is lifted up through the tubing above the pump stages and is held constant. However, when the pump is shut down, either purposefully or unexpectedly, the column of fluid in the tubing falls back down through the ESP assembly until the column height is equal to the static fluid height in the well.

Many underground formations contain well born solids, such as consolidated and unconsolidated sand. Production fluid passes these abrasives on its way to the pump and carries them into and through the pump assembly. A problem that occurs is that the sand becomes suspended in the production fluid and, when the pump is shutdown or loses power, the sand falls down through the assembly with the falling column. The sand is carried into the pump stages and collects and accumulates at the top of the upper-most pump stage. Accumulated sand will pack and plug the pump stages, blocking the flow of well fluid when resumption of operation is attempted. Further, the falling sand can damage or break the ESP shafts and shorten the operational lifetime of the ESP assembly.

Currently, attempts have been made to employ check valves in the production string to avoid fallback of production fluid during interruptions to ESP operation. However, conventional check valves are primarily effective against fallback of liquid, and are not well suited for use with solid-laden fluid. The accumulation of sand also causes the check valves to become stuck in the closed position, leading to failure of the assembly to lift well fluid to the surface once resumption of operation is attempted.

As is apparent from the above, currently available valves are not well suited to handle sand fallback through ESP production tubing. Therefore, there is a need for a fallback prevention valve apparatus, system and method.

SUMMARY

One or more embodiments of the invention enable a fallback prevention valve apparatus, system and method.

A fallback prevention valve apparatus, system and method is described. An illustrative embodiment of an electric submersible pump (ESP) fallback prevention system includes a fallback valve configured to be placed between a discharge of a centrifugal pump of a ESP assembly and production tubing of the ESP assembly, the fallback valve actuatable by a flow of fluid passing at least partially through the fallback valve, the fallback valve actuatable between an open position, wherein fluid flowing into the fallback valve in a first direction away from the centrifugal pump actuates the fallback valve into the open position, and a closed position, wherein fluid flowing into the fallback valve in a second direction towards the centrifugal pump actuates the fallback valve into the closed position, the closed position configured to block sand carried by the fluid from entering the centrifugal pump. In some embodiments, the fallback valve includes a set of discs, each disc of the set of discs having openings, wherein the openings of each disc are aligned when the fallback valve is in an open position and the openings of a first disc of the set of discs are unaligned with the openings of a second disc of the set of discs when the fallback valve is in a closed position. In certain embodiments, the set of discs are stacked around a valve shaft, the valve shaft rotatable independently from a shaft of the centrifugal pump, and an impeller coupled to the valve shaft turns the valve shaft to actuate the first disc between the open position and the closed position. In some embodiments, the first disc rotates with respect to the second disc to actuate the set of discs, and a stopper system limits rotation of the first disc to less than a full rotation. In certain embodiments, the fallback valve further includes a vent port extending through a housing of the fallback valve, the vent port configured to vent fluid from inside the fallback valve into a casing annulus when the vent port is open, wherein the vent port is configured to be open when the fallback valve is in the closed position, and the vent port is configured to be closed when the fallback valve is in the open position. In some embodiments, the fallback valve includes a rotatable disc, and a bottom face of the rotatable disc includes a relief groove, wherein when the fallback valve is in the closed position the relief groove is fluidly coupled to the vent port and the relief groove is configured to guide production fluid outward along the rotatable disc to at least partially actuate the valve into the open position. In certain embodiments, the relief groove is fluidly coupled to a depression on the bottom face of the rotatable disc, and when the fallback valve is in the closed position, the depression is aligned with an opening of a nonrotatable disc, the nonrotatable disc positioned between the bottom face of the rotatable disc and the centrifugal pump. In some embodiments, the fallback prevention system further includes a second nonrotatable disc opposite a top face of the rotatable disc, the nonrotatable disc and the second nonrotatable disc each including an outer diameter sealed to the housing.

An illustrative embodiment of a fallback prevention valve includes an independent shaft, at least one impeller secured to the independent shaft such that the shaft and the at least one impeller rotate together, a set of discs stacked around the independent shaft, each disc of the set of discs having a series of openings dispersed around the disc, the set of discs including a pair of nonrotatable discs including a first nonrotatable disc and a second nonrotatable disc, wherein the series of openings of the first nonrotatable disc are aligned with the series of openings of the second nonrotatable disc, and a rotatable disc between the pair of nonrotatable discs, the rotatable disc rotatable with the independent shaft between an open position, wherein the series of openings of the rotatable disc are aligned with the series of openings of each of the nonrotatable discs in the open position, and a closed position, wherein the openings of the rotatable disc are dispersed between the openings of the each of the nonrotatable discs in the closed position. In some embodiments, the at least one impeller rotates the independent shaft to turn the rotatable disc. In certain embodiments, fluid flowing downstream passed the at least one impeller turns the independent shaft in a rotation of a first type that rotates the rotatable disc to the open position. In some embodiments, fluid flowing upstream passed the at least one impeller turns the independent shaft in a rotation of a second type opposite the first type that rotates the rotatable disc into the closed position. In some embodiments, a bottom side of the rotatable disc has a depression and when the rotatable disc is in the closed position, the depression is aligned with a particular opening of the series of openings of the first nonrotatable disc, and further including a relief groove extending between the depression and a vent port, the vent port configured to vent fluid to a casing annulus when the rotatable disc is in the closed position. In certain embodiments, the vent port extends through a fallback valve housing and the vent port is blocked when the rotatable disc is in the open position. In some embodiments, the vent port is blocked by a ball seated in a ball seat proximate an outer diameter of the rotatable disc. In certain embodiments, each nonrotatable disc of the pair of nonrotatable discs is pinned to a fallback valve housing, and the rotatable disc is keyed to the independent shaft. In some embodiments, the fallback prevention valve further includes a stopper system for the rotatable disc, the stopper system including a notch extending partially around an outer diameter of the rotatable disc, and a rod extending from one of the nonrotatable discs into the notch, the stopper system preventing rotation of the rotatable disc beyond an arc length of the notch.

An illustrative embodiment of a fallback prevention method includes utilizing a potential energy of a column of production fluid to actuate a fallback valve coupled to production tubing of an electric submersible pump (ESP), wherein the column of production fluid moving upstream closes the fallback valve and the column of production fluid moving downstream opens the fallback valve, and preventing sand from falling into the ESP with the closed valve when the ESP shuts down. In some embodiments, the fallback prevention method further includes using upstream flow of production fluid to both close the fallback valve and open a leak path to a casing annulus of the ESP. In certain embodiments, the upstream flow of production fluid rotates an independent shaft to close the fallback valve. In some embodiments, the fallback prevention method further includes using downstream flow of production fluid to both open the fallback valve and close a leak path. In some embodiments, the downstream flow of production fluid continues flowing outward through the leak path and into a casing annulus to rotate an independent shaft and open the fallback valve. In certain embodiments, the fallback prevention method further includes closing the leaking path by moving a ball to block a vent port in a housing of the fallback valve.

An illustrative embodiment of an electric submersible pump (ESP) fallback prevention system includes an ESP assembly positioned in a downhole well, the ESP assembly including production tubing extending between a centrifugal pump and a surface of the downhole well such that during operation of the ESP assembly production fluid flows upward from the centrifugal pump through the production tubing to the surface, the production tubing including a fallback valve actuatable by the flow of production fluid, the fallback valve actuatable between an open position, wherein production fluid flowing upward through the fallback valve actuates the fallback valve into the open position, and a closed position, wherein production fluid flowing downward through the fallback valve actuates the fallback valve into the closed position, the closed position blocking sand carried by the production fluid from falling into the centrifugal pump.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings in which.

Figure 1:
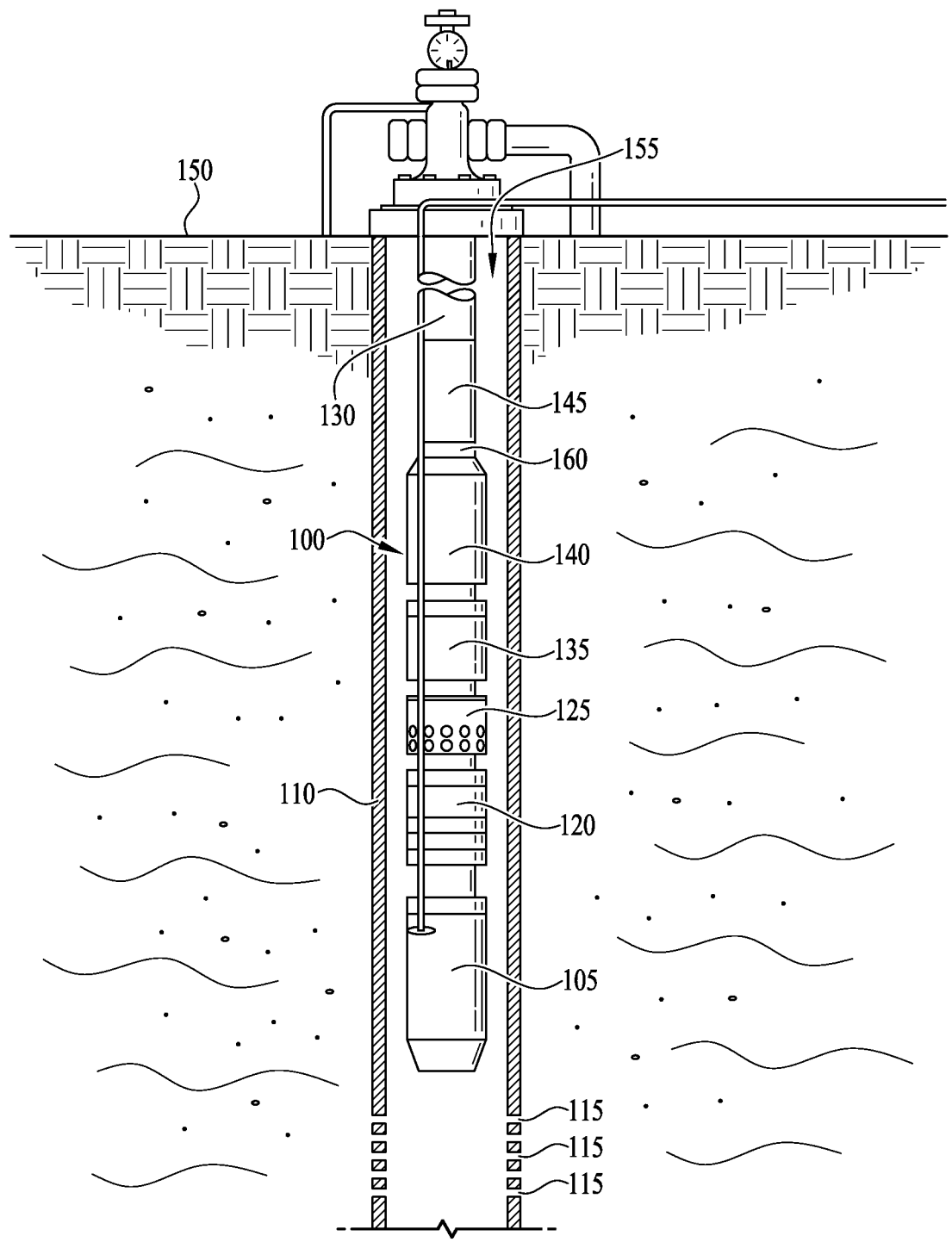
FIG. 1 is a perspective view of an electric submersible pump (ESP) assembly of an illustrative embodiment.

While the invention is susceptible to various modifications and alternative forms, specific embodiments thereof are shown by way of example in the drawings and may herein be described in detail. The drawings may not be to scale. It should be understood, however, that the embodiments described herein and shown in the drawings are not intended to limit the invention to the particular form disclosed, but on the contrary, the intention is to cover all modifications, equivalents and alternatives falling within the scope of the present invention as defined by the appended claims.

DETAILED DESCRIPTION

A fallback prevention valve apparatus, system and method is described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a "disc" includes one or more discs.

"Coupled" refers to either a direct connection or an indirect connection (e.g., at least one intervening connection) between one or more objects or components. The phrase "directly attached" means a direct connection between objects or components.

As used herein, the "top" of an element refers to the side of the element that would be furthest downstream when fluid is being lifted in the direction of intended production during pump operation, without regard to whether the fallback valve operates or is configured to operate in a horizontal, vertical or angled direction and/or extends through a radius.

As used herein, "bottom" of an element refers to side of the element that would be the furthest upstream when fluid is being lifted in the direction of intended production during pump operation, without regard to whether the fallback valve operates or is configured to operate in a horizontal, vertical or angled direction and/or extends through a radius.

In the art, "outer diameter" and "outer circumference" are sometimes used equivalently. As used herein, the outer diameter is used to describe what might otherwise be called the outer circumference or outer surface of a tubular and/or annular component such as a disc or a housing.

In the art, "inner diameter" and "inner circumference" are sometimes used equivalently. As used herein, the inner diameter is used to describe what might otherwise be called the inner circumference or inner surface of a tubular and/or annular component such as a disc or housing.

As used herein the terms "axial", "axially", "longitudinal" and "longitudinally" refer interchangeably to the direction extending along the length of a valve shaft.

As used in this specification and the appended claims "fallback" means fluid and/or solids carried by such fluid that flow upstream and/or opposite to the intended direction of production flow when, after commencement of pump operations, the pump operation is ceased.

As used in this specification and the appended claims, "independent" with respect to a shaft means a shaft that is not attached, rotated by or configured to be rotated by, either directly or indirectly, the drive shaft of a pump string. By way of example but not limitation, in electric submersible pump (ESP) embodiments, an independent shaft is not attached to any of the centrifugal pump shaft, intake shaft, seal section shaft or motor shaft of the ESP string.

As used herein, "sand" is used liberally to refer to dirt, sand, rock, proppant, solids and/or any other non-liquid, non-gaseous substance carried by production fluid and/or fluid lifted by a pump of illustrative embodiments.

For ease of description and so as not to obscure the invention, illustrative embodiments are primarily described herein in terms of a vertical, downhole ESP assembly. However, illustrative embodiments may be equally applied to angled, curved or horizontal assemblies and/or to any fluid moving or lifting pump assembly susceptible to sand fallback where, after operation commences, the pump may be stopped and restarted. Illustrative embodiments may be applied to assemblies having radial-flow, axial-flow, and mixed-flow centrifugal pumps and/or surface pumps.

Illustrative embodiments may provide a valve that reduces and/or prevents fallback of production fluid through an ESP despite operation of the ESP in high-sand environments, such as for example, hydraulically fractured wells. A fallback prevention valve of illustrative embodiments may reduce the likelihood of damage to the ESP assembly as a result of falling sand when the pump is turned off and/or stopped and/or may prevent sand packing in the pump stages and the resulting loss of production. Illustrative embodiments may provide an improved fallback prevention valve that may not become clogged or stuck in a closed position as a result of solid-laden well fluid and/or use in high-sand environments.

Illustrative embodiments may provide a fallback prevention valve that utilizes the potential energy of a column of production fluid to open and close the valve. Production fluid flowing downwards and/or upstream through the valve may close the valve, whereas production fluid flowing upwards and/or downstream through the valve may open the valve. The fallback prevention valve may be located between sections of production tubing downstream from the pump discharge and/or between the pump discharge and production tubing. When closed, the valve may protect the pump from fallback without the valve becoming stuck in a closed position. When open, the valve may allow the pump to produce without impeding production flow.

A valve of illustrative embodiments may include a set of discs that includes a rotatable disc and a nonrotatable disc. The set of discs may be stacked around an independent valve shaft. Each disc may have a set of openings, which openings may align when the valve is open, and become offset when the valve is closed. An impeller attached to the valve shaft may turn the valve shaft to rotate the rotatable disc open and closed. Production fluid flowing downstream through the valve may rotate the impeller to align the openings in the discs and open the valve. Production fluid flowing upstream through the valve may rotate the impeller to misalign the openings and close the valve. A pluggable leak path extending across the bottom face of the rotatable disc and through the valve housing may allow fluid leakage into the casing annulus when the valve is closed. The leak path may provide a relief path to the casing annulus and/or radial momentum that may assist in actuating the valve from a closed position to an open position. Once the valve opens, the leak path may advantageously be plugged to prevent leakage of well fluid into the casing annulus during fluid production.

Illustrative embodiments may include an artificial lift assembly, such as an ESP assembly, which may be located downhole below the surface of the ground. FIG. 1 shows an exemplary ESP assembly 100. ESP assembly 100 may be vertical, horizontal, angled or may extend through a bend, and may be positioned within well casing 110, which casing 110 may separate ESP assembly 100 from an underground formation. Casing 110 may include perforations 115 for entry of well fluid into casing annulus 155 and/or ESP pump 140. Casing annulus 155 may be a space that separates ESP assembly 100 from casing 110. Well fluid may enter casing 110 through perforations 115 before traveling through casing annulus 155 towards assembly intake 125, which assembly intake 125 may serve as the intake for well fluid into ESP assembly 100. Motor 105 may include a rotating drive shaft that turns ESP pump 140 and may, for example, be a two-pole, three-phase squirrel cage induction motor. Seal section 120 may be a motor protector, serving to equalize pressure and keep motor oil separate from well fluid. Gas separator 135 may optionally be employed in gassy wells and separate gas prior to 5 the gas' entry into ESP pump 140. ESP Pump 140 may be a multi-stage centrifugal pump and may lift fluid to surface 150. ESP pump 140 may include stages of rotating impellers paired with stationary diffusers, stacked around a rotating pump shaft that may be connected and/or splined to the drive shaft. Production tubing 130 may carry produced fluid to a wellhead on surface 150, and then into a pipeline, storage tank, transportation vehicle and/or other storage, distribution or transportation means.

Fallback prevention valve 145 may be secured between pump discharge 160 and production tubing 130 and/or between sections of production tubing 130 downstream of the pump discharge 160. Valve 145 may selectively block or permit the flow of production fluid through valve 145, depending on whether valve 145 is in an open position or a closed position.

Fallback prevention valve 145 may be bolted, threaded, or similarly coupled to ESP assembly 100 adjacent pump 140 discharge 160 and/or interposed between and/or within production tubing 130.

Figure 2A:
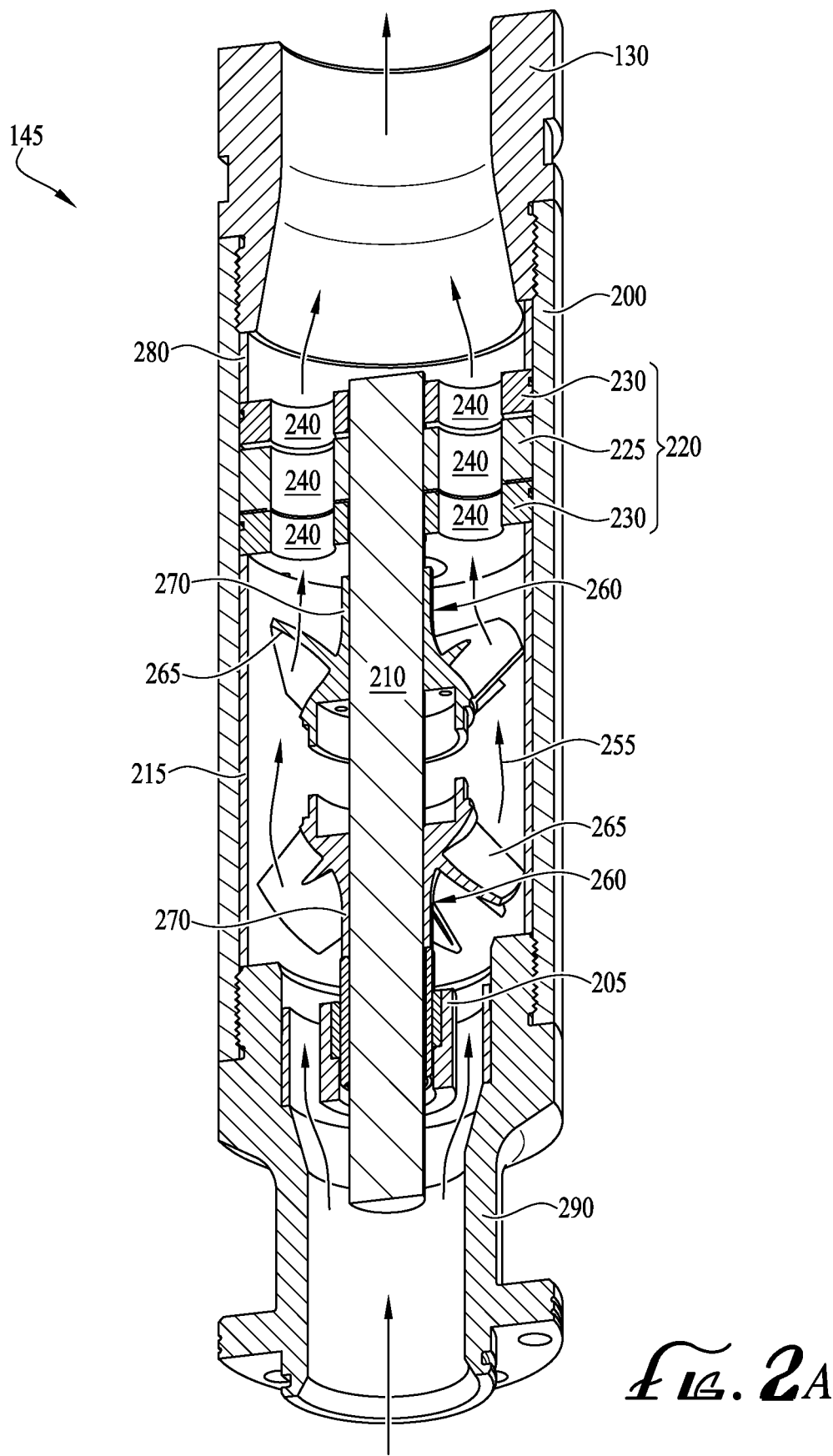
FIG. 2A is a cross sectional view of a fallback prevention valve of an illustrative embodiment in an exemplary open position.

Turning to FIGS. 2A-213, a stack of discs 220 may be included within valve 145. The stack of discs 220 may include one or more rotatable discs 225 and one or more nonrotatable discs 230. In FIGS. 2A-213, one rotatable disc 225 is positioned between two nonrotatable discs 230 to form stack of discs 220. Each disc 225, 230 may be a disc and/or plate, may have a central aperture to receive valve shaft 210 and/or be annular in shape. Valve shaft 210 may extend through the central aperture of each disc 225, 230, with valve shaft 210 extending centrally and longitudinally through valve 145. One or more impellers 260 may include hub 25 270 keyed or otherwise attached to valve shaft 210 such that valve shaft 210 rotates and/or pivots with impellers 260. Valve shaft 210 may be independent and/or may not be attached to any non-valve shafts either below or above valve 145. Valve shaft 210 may include one or more valve shafts 210 splined and/or otherwise attached together, depending on the length of valve 145. Shaft 210 may be free to rotate in either a clockwise direction or a counterclockwise direction, as dictated by and/or in response to the flow of fluid passing by.

Figure 2B:
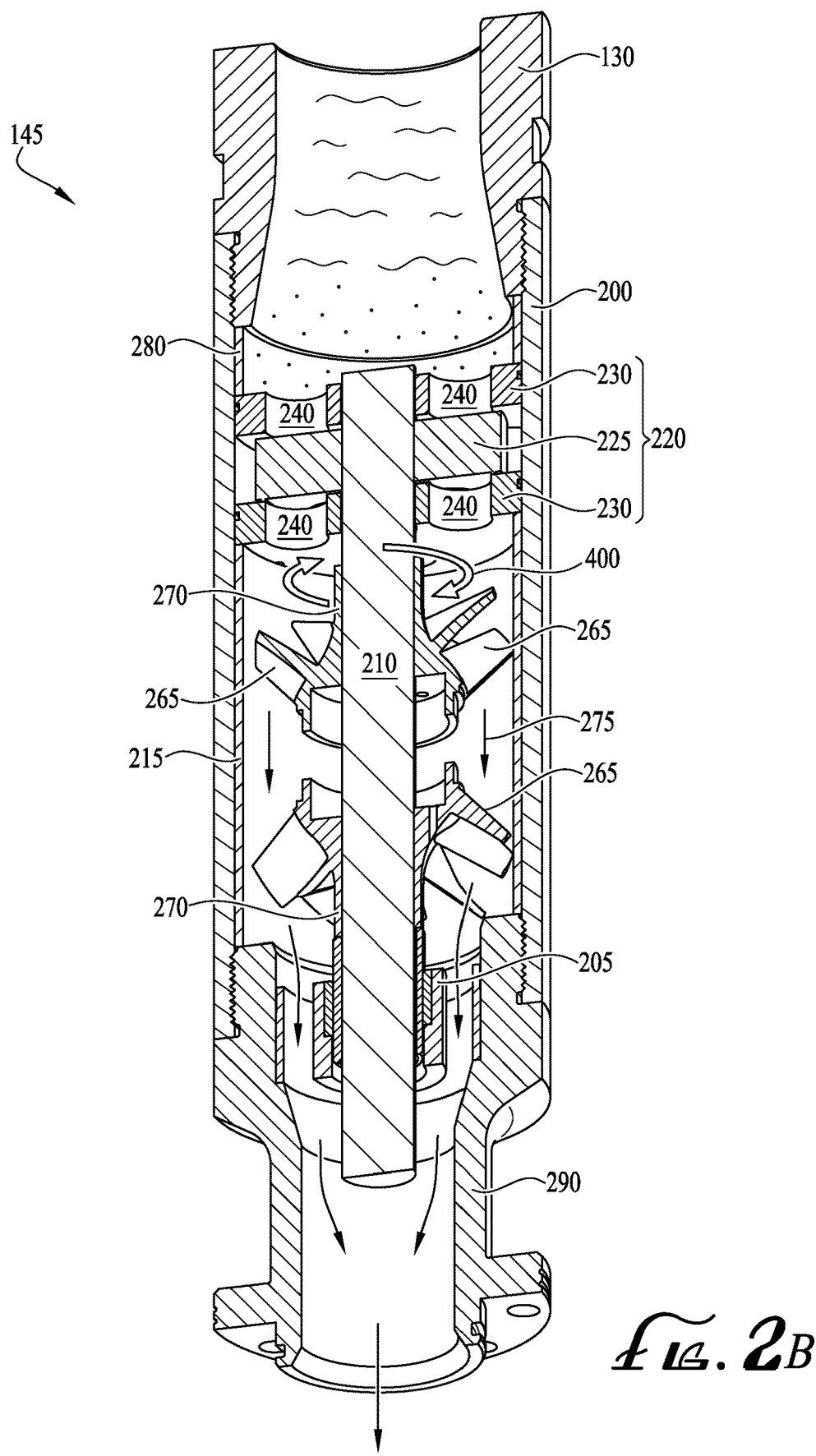
FIG. 2B is a cross sectional view of a fallback prevention valve of an illustrative embodiment in an exemplary closed position.

One or more impellers 260 may turn valve shaft 210 either clockwise or counterclockwise, depending on the direction of fluid flow into and/or through valve 145. Impeller 260 may convert axial momentum of flowing well fluid into rotational momentum, which may cause valve shaft 210 to rotate and, as a result, open or close valve 145, depending on the direction of fluid flow. In some embodiments, a propeller, blades and/or fins may be used rather than or in addition to impeller 260. In some embodiments, two impellers 260 facing in opposing directions may be included around valve shaft 210, with each impeller 260 operating to rotate valve shaft 210 in an opposing direction, depending on the direction of fluid flow. As shown in FIG. 2A and FIG. 2B, first impeller 260 closest to stack of discs 220 may be arranged to turn in a rotation of a first type in response to fluid flowing from below first impeller 260 upwards and/or along downstream flow path 255, thereby rotating valve shaft 210 along with rotatable disc 225 in the first type of rotation, for example clockwise. Second impeller 260 closest to adapter 290 may be arranged to turn in a rotation of a second type, opposite the first type of rotation, in response to fluid flowing from above second impeller 260 downwards and/or along upstream flow path 275, thereby rotating valve shaft 210 along with rotatable disc 225 in the second type of rotation, for example counterclockwise. In some embodiments, only a single impeller 260 may be employed to rotate valve shaft 210 in both clockwise and counterclockwise directions and/or the directions of rotation may be reversed. Impeller vane 265 may extend radially outward from hub 270 to cross into the expected flow path of well fluid flowing through valve 145, for example downstream flow path 255 in FIG. 2A or upstream flow path 275 in FIG. 2B.

Each disc 225, 230 may extend radially between shaft 210 and valve housing 200. Each disc 225, 230 may include a series of circumferentially dispersed openings 240 extending through each disc 225, 230. When openings 240 of rotatable disc 225 are aligned with openings 240 of nonrotatable discs 230, valve 145 may be open, whereas offsetting openings 240 of rotatable disc 225 and nonrotatable disc 230 respectively may close valve 145. FIG. 2A illustrates an open valve 145 with fluid being produced through valve 145 towards production tubing 130, and FIG. 2B illustrates fluid falling back and closing valve 145.

The stack of discs 220 may include one or more rotatable discs 225 coupled to valve shaft 210 such that the rotatable disc 225 rotates with shaft 210. Rotatable disc 225 may be keyed, bolted, or otherwise secured to shaft 210 such that rotatable disc 225 rotates and/or pivots with valve shaft 210 in two types of rotations and/or directions, such as clockwise and counterclockwise. The central aperture of discs 225, 230 may fit securely around shaft 210 and/or be sealed such that fluid may not leak between the outer diameter of valve shaft 145 and the stack of discs 220. The outside diameter of rotatable disc 225 may be separated from the inside diameter of housing 200 by a slight clearance so as to allow rotatable disc 225 to rotate inside of housing 200 without impediment and/or without friction between the outer diameter of rotatable disc 225 and the inner diameter of housing 200.

Figure 3:
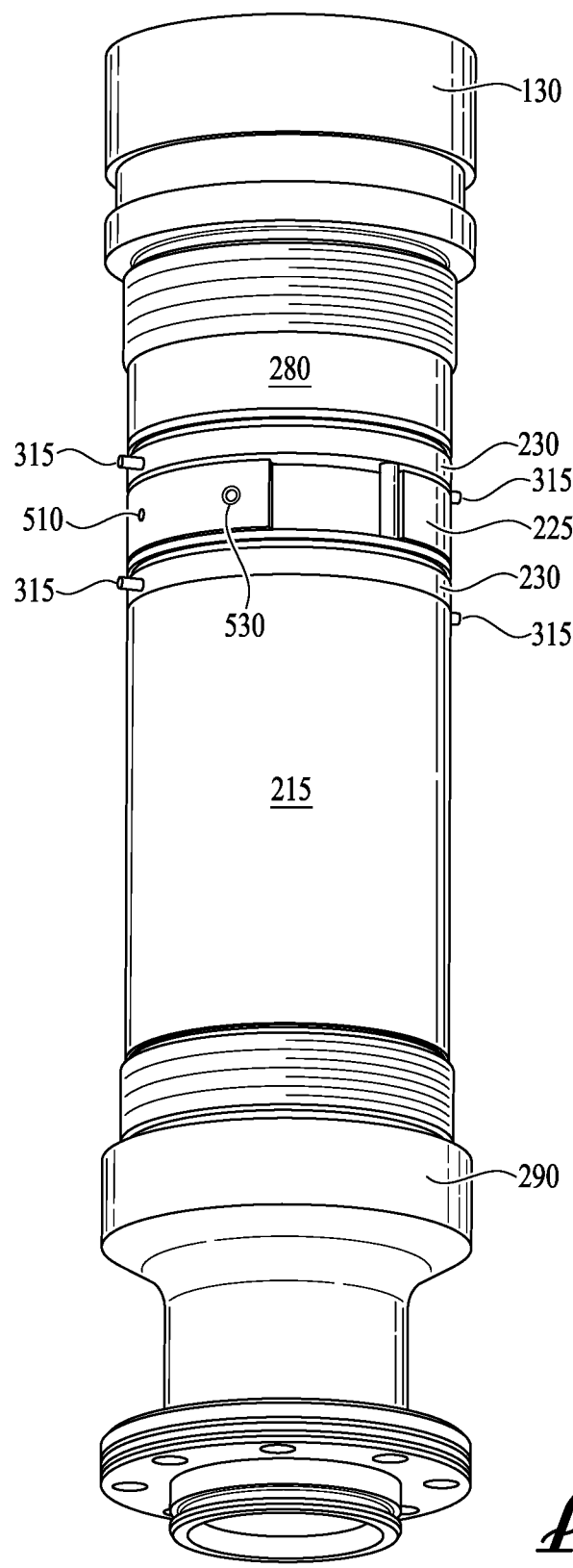
FIG. 3 is a perspective view of a fallback prevention valve of an illustrative embodiment with housing cut away.

Outer diameter of nonrotatable disc 230 may be secured to valve housing 200, lining 215 and/or compression tube 280 and may not rotate despite rotation of valve shaft 210. The outside diameter of nonrotatable disc 230 may be friction-fit, pinned, bolted and/or otherwise connected to the inside diameter of housing 200 such that nonrotatable disc 230 remains stationary inside housing 200 and does not rotate despite rotation of valve shaft 210 and/or rotatable disc 225. Turning to FIG. 3, pin 315 may extend radially from the outer diameter of nonrotatable disc 230 and into housing 200 of valve 145. In FIG. 3 housing 200 has been removed for illustration purposes, and illustrates the outer diameter of discs 225, 230. Pin 315 may prevent rotation of nonrotatable discs 230 despite rotation of adjacent rotatable disc 225 and/or rotation of valve shaft 210. Lining 215 may be included on an inside diameter of housing 200. Lining 215 may line the inside of housing 200 below stack of discs 220. Compression tube 280 may line the inner diameter of housing 200 above the stack of discs 220. Compression tube 280 and/or lining 215 may wedged, hold, guide and/or secure nonrotatable discs 230 in position from above and below, and may prevent axial movement of the stack of discs 220. Discs 225, 230 making up stack 220 may be compressed axially between lining 215 and compression tube 280 and may thus be prevented from sliding axially along shaft 210. Nonrotatable discs 230 above and below rotatable disc 225 may block fluid from passing by the outer diameter of the stack of discs 220.

Returning to FIG. 2A and FIG. 2B, valve housing 200 may enclose valve 145, separating valve 145 from casing annulus 155. Housing 200 may be coupled and/or attached between sections of production tubing 130 and/or between production tubing 130 and pump discharge 160, for example by threading, bolting and/or screws. In the example shown in FIG. 2A and FIG. 2B, valve housing 200 is threaded to production tubing 130 and threaded to adapter 290, which adapter 290 bolts to pump discharge 160. Valve 145 may include one or more bearing sets 205 around shaft 210. Bearing set 205 may include a spider bearing, sleeve and/or bushing or similar type of bearing that allows passage of well fluid in either direction, without disturbing production flow rate, and while providing radial and/or axial thrust support for valve shaft 210. One or more bearing sets 205 may be employed and spaced as needed along valve shaft 210, for example depending on the length of valve shaft 210.

Figure 4A:
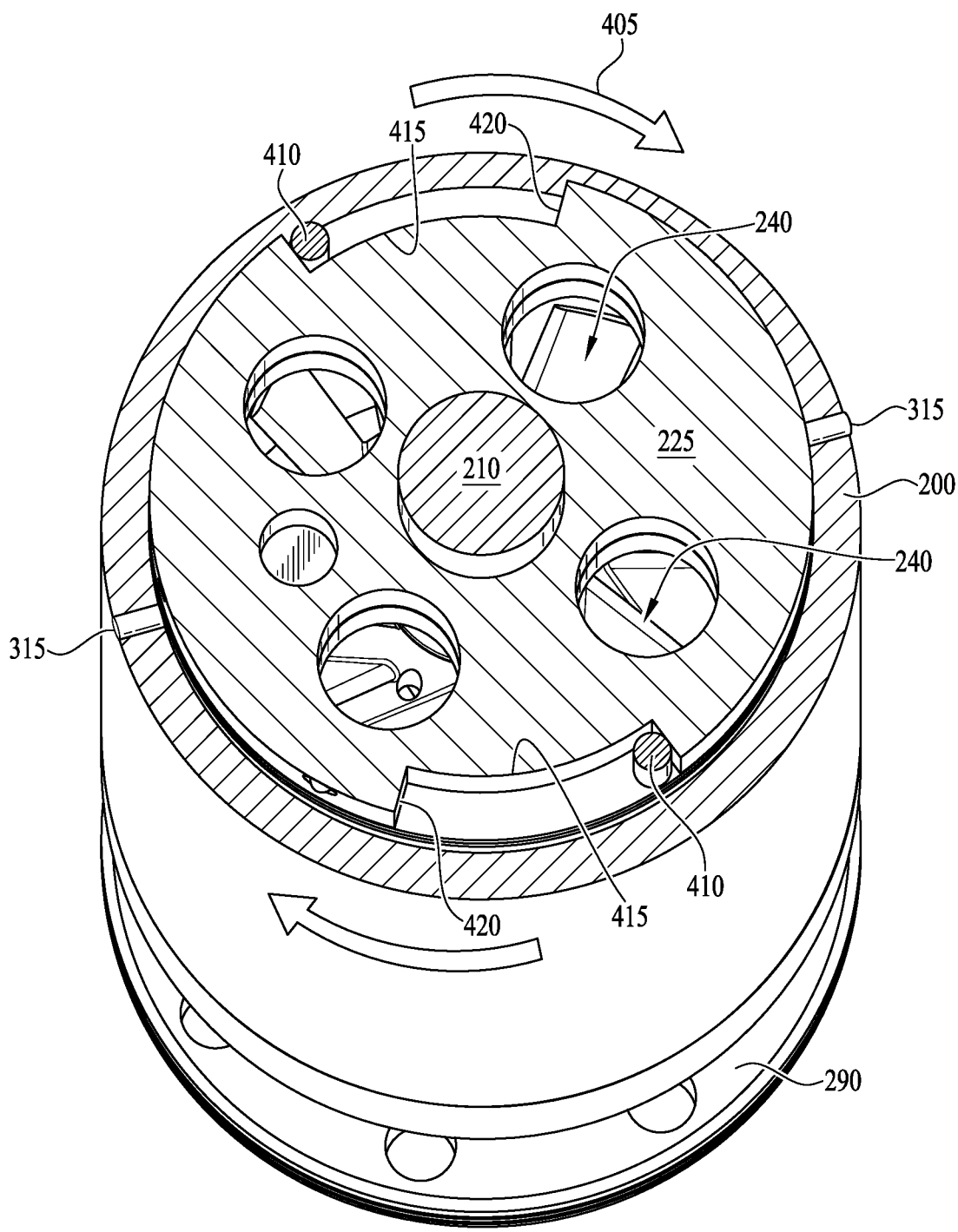
FIG. 4A is a cross sectional view of a fallback prevention valve of an illustrative embodiment in an exemplary open position and viewed from above a rotatable disc of an illustrative embodiment.
Figure 4B:
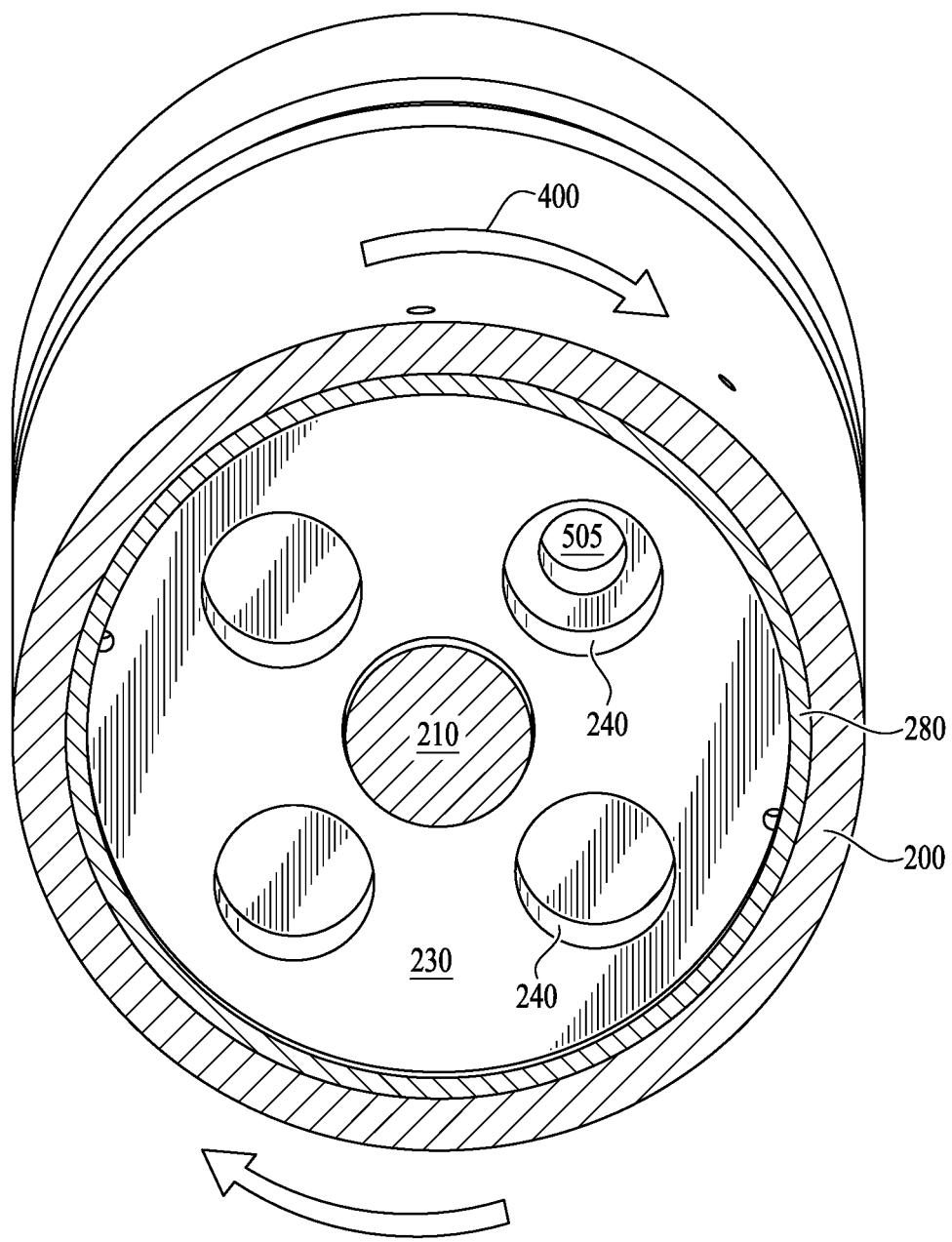
FIG. 4B is a cross sectional view of fallback prevention valve of an illustrative embodiment in an exemplary closed position and viewed from below a nonrotatable disc of an illustrative embodiment.

FIG. 4A illustrates a cross section of valve 145 viewed from above and looking down at rotatable disc 225 of an illustrative embodiment. In FIG. 4A, valve 145 is shown open, and has been rotated clockwise when viewed from above to open valve 145, as shown by valve opening arrow 405. FIG. 4B illustrates stack of discs 220 viewed from below the bottom of stack 220 and looking upwards. In FIG. 4B, valve 145 is shown closed and has been rotated closed, as illustrated by valve closing arrows 400. Those of skill in the art may appreciate that the direction of rotation to open and close valve 145 may equally be reversed provided valve opening arrow 405 and valve closing arrow 400 are rotations in opposite directions and/or rotations of different types from one another. Openings 240 may be spaced circumferentially around each disc 225, 230. In an exemplary embodiment, four openings 240 may be spaced around each of nonrotatable disc 230 and rotatable disc 225. In other embodiments, more or less than four openings 240 arranged in one or more rows may be included to accommodate variations in production rate and/or variations in valve 145 diameter, for example. In embodiments where the stack of discs 220 includes more than one nonrotatable disc 230, openings 240 in the respective nonrotatable discs 230 may be aligned with one another during installation and may be maintained in an aligned position regardless of whether valve 145 is open or closed. Rotatable disc 225 may be rotated to move the openings 240 in rotatable disc 225 out of alignment or into alignment with the openings 240 in nonrotatable disc 230.

The range of motion and/or permitted degrees of rotation of rotatable disc 225 may be limited to less than a full rotation in order to ensure that rotation of valve shaft 210 results in the appropriate alignment or misalignment of openings 240, as applicable to open or close valve 145. The range of permitted rotation may depend upon the arrangement of openings 240 around the discs 225, 230. For example where each disc 225, 230 has four, evenly spaced openings 240, rotatable disc 225 may rotate 45° between a fully open valve 145 position and a fully closed valve 145 position. In another example, where each disc 225, 230 has two evenly spaced openings 240, rotatable disc 225 may rotate 90° between a fully open valve 145 and a fully closed valve 145.

Valve 145 may include a stopper system to limit motion of rotatable disc 225. Rotatable disc 225 may include one or more notches 415 set into the outer diameter of rotatable disc 225. Notch 415 may extend circumferentially an arc length equal to the range of permitted rotation of rotatable disc 225. Walls 420 may be formed at the sides of each notch 415. Rod 410 may extend axially from one nonrotatable disc 230 into notch 415 in an adjacent rotatable disc 225. In the example of FIG. 4A, rods 410 extend upwards into notch 415 from a nonrotatable disc 230 that is below rotatable disc 225. In some embodiments, rods 410 may extend downwards from a nonrotatable disc 230 that is above rotatable disc 225 in addition to or instead of upward extending rods 410. The action of rod 410 bumping up against wall 420 of notch 415 may stop rotation of rotatable disc 225, despite continued fluid flow through valve 145, if any. The arc length of notch 415 may determine the range of motion of rotatable disc 225. As shown in FIG. 4A, two opposing notches 415 are spaced 180° apart and one rod 410 extends into each notch 415.

Figure 5A:
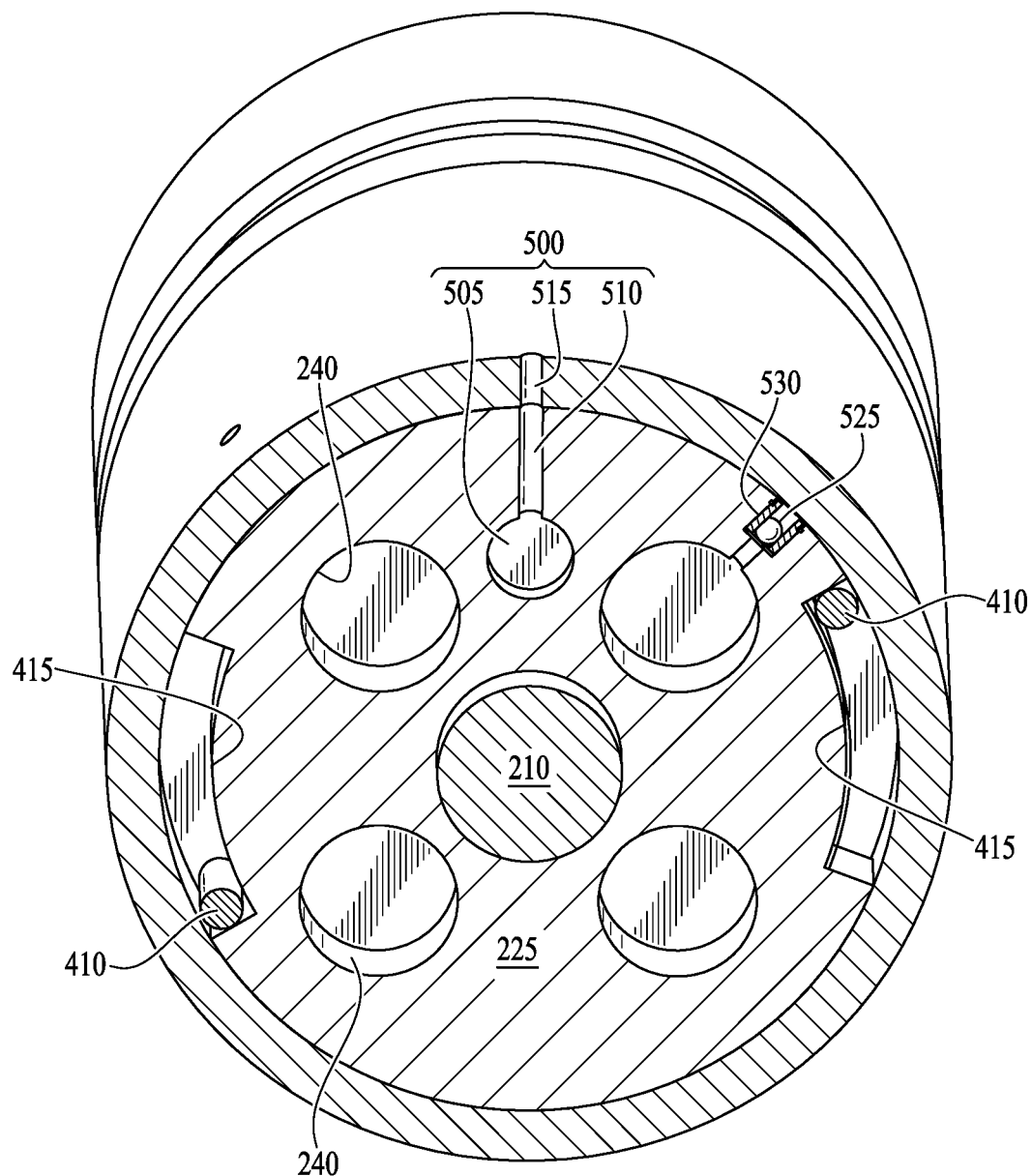
FIG. 5A is a cross sectional view of a closed fallback prevention valve of an illustrative embodiment with an open vent port of an illustrative embodiment.
Figure 5B:
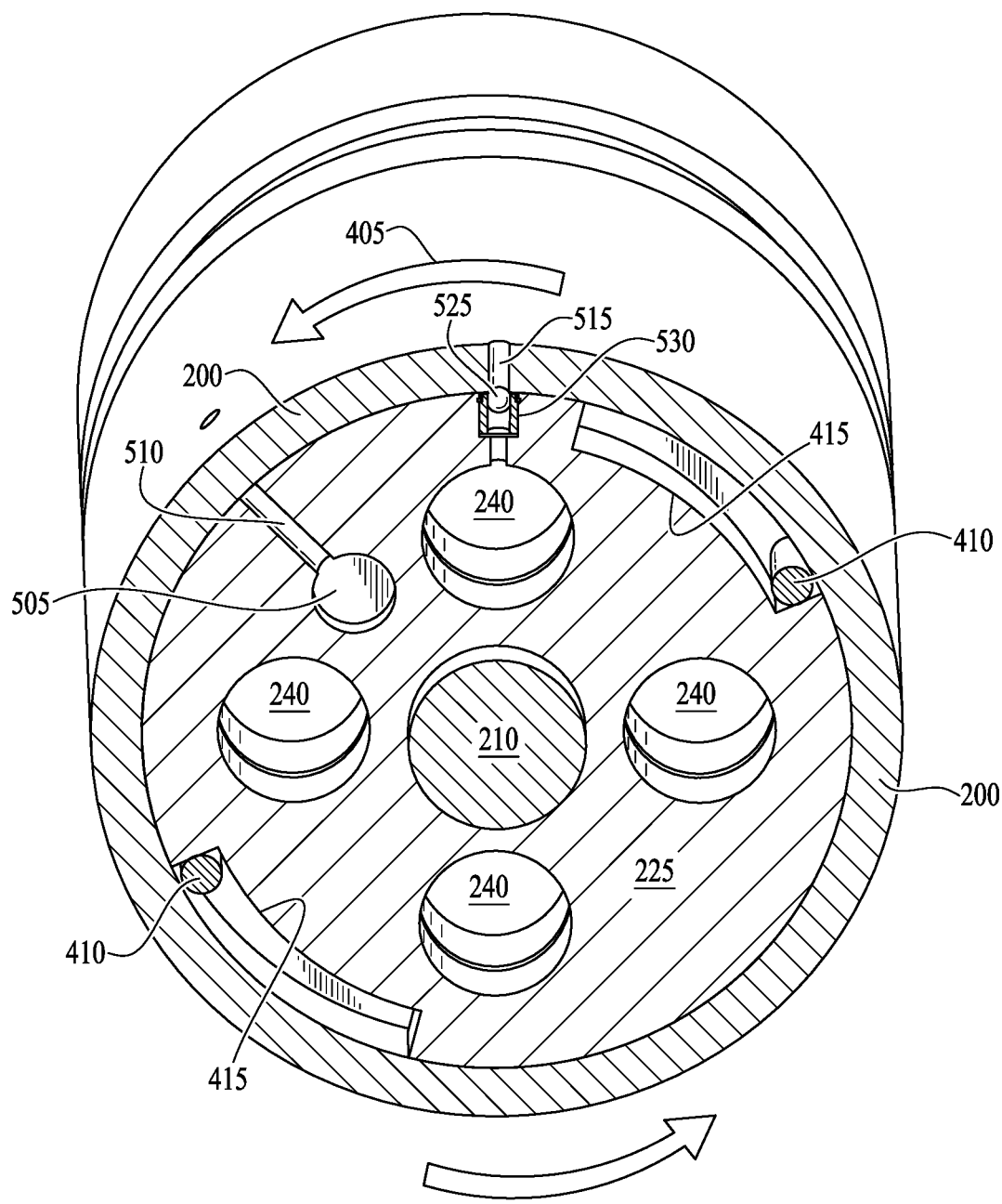
FIG. 5B is a cross sectional view of an open fallback prevention valve of an illustrative embodiment with a closed vent port of an illustrative embodiment.

A relief opening to annulus 155 may be provided in order to initiate flow to open valve 145. Leak path 500 may assist valve 145 to actuate open by allowing fluid to move past impeller 260 and/or rotatable plate 225 when valve 145 is closed. FIG. 5A illustrates valve 145 in a closed position with exemplary leak path 500 forming a relief opening to annulus 155. When leak path 500 and/or vent port 515 is open, leak path 500 may extend across the bottom-facing (upstream) side of rotatable disc 225 and/or below stack of discs 220, to provide a fluid flow path radially outward along rotatable disc 225 that may provide torque to rotate rotatable disc 225 and/or valve shaft 210 and/or provide a relief path for fluid until valve 145 opens for resumption of operation. Leak path 500 may be open when valve 145 is closed and may be plugged (closed) when valve 145 is open. Depression 505 and/or relief groove 510 may provide space between the bottom face of rotatable disc 225 and the adjacent nonrotatable disc 230 to permit fluid to flow, continue along leak path 500 and/or flow to continue past impeller 260, despite valve 145 being in the closed position. FIG. 5A and FIG. 5B illustrate a portion of valve 145 viewed from below and looking up at the bottom of rotatable disc 225, and showing a leak path of an illustrative embodiment. FIG. 5A illustrates a closed valve 145 and an open leak path 500, whereas FIG. 5B illustrates an open valve 145 and a closed leak path 500.

Leak path 500 may extend along the bottom facing side of rotatable disc 225 so as to receive fluid lifted by pump 140. Leak path 500 may include depression 505 on the bottom face of rotatable disc 225. When leak path 500 is open, depression 505 may capture a pool of fluid that may be guided along leak path 500 radially across relief groove 510 on the bottom face of rotatable disc 225, through vent port 515 in housing 200, and into casing annulus 155. Unlike openings 240, depression 505 may extend only partially into rotatable disc 225 like a groove and in some embodiments may be smaller than any openings 240. Depression 505 may be located on rotatable disc 225, between openings 240 on rotatable disc 225, such that depression 505 is aligned with an opening 240 on nonrotatable disc 230 when valve 145 is closed. As shown in FIG. 4B, when fallback valve 145 is closed, depression 505 may be exposed to downstream-flowing fluid to catch the fluid and guide the fluid along relief groove 510. Relief groove 510 may be fluidly coupled to depression 505 and may extend from depression 505, radially across the bottom-facing side of rotatable disc 25, to the outer diameter of rotatable disc 225. As shown in FIG. 5A, when leak path 500 is open, vent port 515 in valve housing 200 may align with relief groove 510, and may extend radially through housing 200 to create a pathway to casing annulus 155. A fluid connection between relief groove 510 and casing annulus 155 may be provided when vent port 515 is open.

When valve 145 is open, leak path 500 may be closed. Ball 525 may close leak path 500 by blocking vent port 515, serving as a barrier to fluid from returning to casing annulus 155 through vent port 515. Ball 525 may be seated within ball seat 530 on bottom (upstream) face of rotatable disc 225 at a location spaced apart from relief groove 510. Ball seat may be positioned proximate an outer diameter of rotatable disc 225 and include a portion of ball seat that abuts and/or intersects the outer diameter of rotatable disc 225. As shown in FIG. 5A, ball seat 530 may be positioned outward of an opening 240 of rotatable disc 225 which opening 240 is adjacent to depression 505 in rotatable disc 225. Ball seat 530 may be positioned such that ball seat 530 is clear of vent port 515 when valve 145 is closed, and ball seat aligns with vent port 515 when valve 145 is open. Thus, leak path 500 and/or vent port 515 may be open when valve 145 is closed, and leak path 500 and/or vent port 515 may be closed when valve 145 is open. In some embodiments the circumferential distance between relief groove 510 and ball seat 530 may be same as the arc length of notch 415. In FIG. 5A, leak path 500 is open, valve 145 is closed and ball seat 530 is spaced apart from and/or clear of vent port 515.

FIG. 5B illustrates ball 525 blocking vent port 515 to close vent port 515 and/or leak path 500 when valve 145 is open. In FIG. 5B, rotatable disc 225 and/or valve shaft 210 has rotated within housing 200 to open valve 145 as shown by valve opening arrow 405. As rotatable disc 225 rotates within housing 200, ball seat 530 moves into a position aligned with vent port 515. Ball 525 may be positioned within ball seat 530 such that ball 525 rolls in front of the entrance to vent port 515 and/or blocks the inner diameter of vent port 515 when ball seat 530 is aligned with vent port 515. The floor of ball seat 530 may be grooved, angled and/or complimentary to vent port 515 to encourage ball 525 to secure into a blocking position in front of vent port 515 when valve 145 is open. When rotatable disc 225 turns to open valve 145, relief groove 510 may become misaligned from vent port 515. When valve 145 is in an open position and pump 140 is producing, the pressure will be high and ball 525 may plug leak path 500 and/or close vent port 515. Leak path 500 may be obstructed to prevent leakage of well fluid into casing annulus 155 once valve 145 is open and leakage ceases to be desirable. On the other hand, when valve 145 closes, ball 525 inside ball seat 530 may similarly be rotated away from vent port 515 whilst relief groove 510 comes into alignment with vent port 515 to the position shown in FIG. 5A, thereby opening leak path 500 to casing annulus 155. In some embodiments, ball 525 may be held in ball seat 530 by a spring.

An open valve 145 may result in an obstructed (closed) leak path 500, and a closed valve 145 may result in an open leak path 500. In some embodiments, vent port 515 may be actuated open and closed by other flow-induced actuation mechanisms and/or other actuation means initiated by the rotation of shaft 210 and/or the rotation of rotatable disc 225, for example springs or flaps. In some embodiments, vent port 515 may extend through housing 200 a distance below stack of discs 220, while still providing rotational momentum and/or fluid flow to assist in actuation of valve 145. An open vent port 515 may provide radial flowing fluid that provides torque and/or rotation to shaft 210 and/or rotatable disc 225 to open valve 145.

Illustrative embodiments may employ potential energy from the flow of fluid through ESP assembly 100 and/or valve 145, to rotate valve 145 into an open position or a closed position based on the direction of such fluid flow. When valve 145 is closed, fluid and solids 15 carried therein may be blocked from flowing through valve 145 and pump 140 may be protected from fallback. Once valve 145 is closed, sand may accumulate above stack of discs 220, but the sand accumulation may not hinder actuation of valve 145, and the sand may be flushed out with production fluid once pump 140 restarts. When valve 145 is open, pump 140 may produce fluid through valve 145 and into production tubing 130.

Figure 6C:
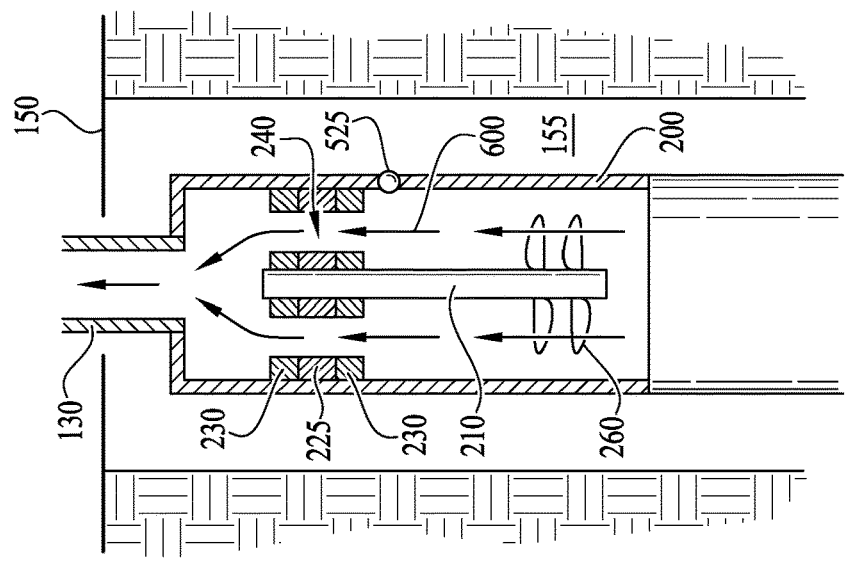
FIGS. 6A-6C are schematic diagrams of a fallback valve of an illustrative embodiment during startup of fluid flow.
Figure 6B:
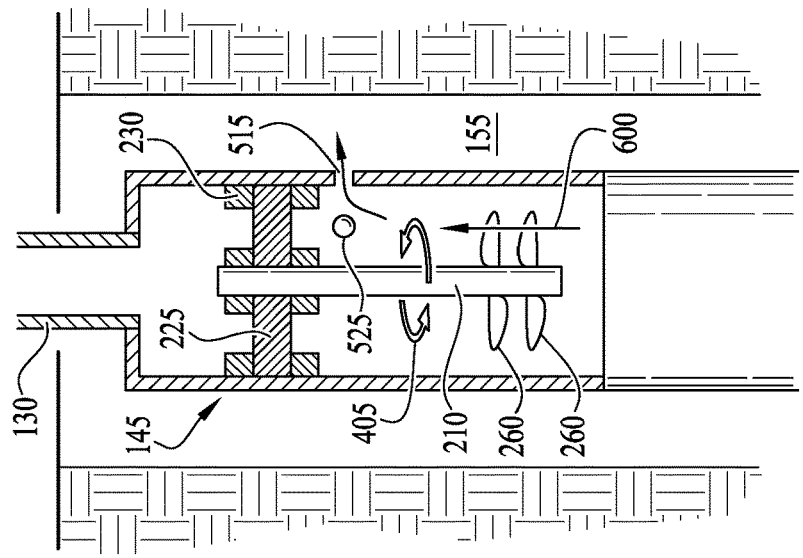
Figure 6A:
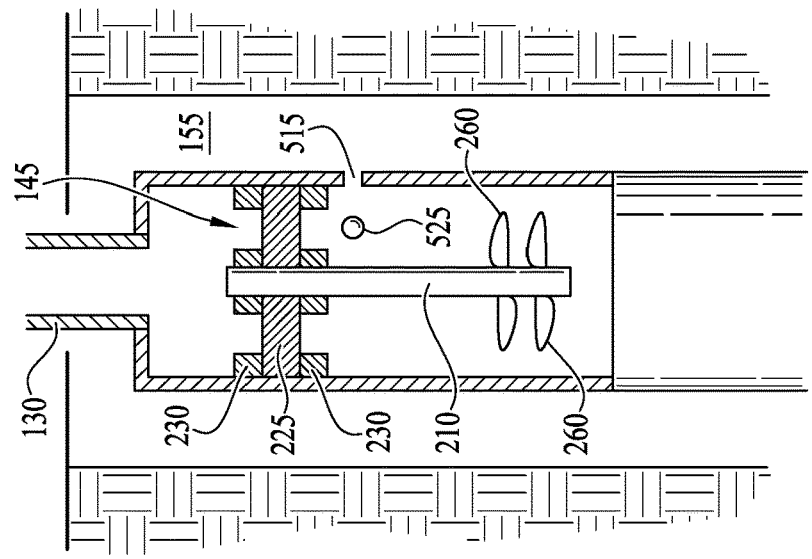

FIGS. 6A-6C show a schematic representation of the fluid-flow initiated actuation of valve 145 of illustrative embodiments where valve 145 starts in a closed state and moves into an open position for production, such as during initial startup or during a restart subsequent to a shutdown of ESP assembly 100. FIG. 6A illustrates valve 145 when pump 140 is off, valve is closed, and no fluid is flowing through valve 145. Openings 240 in rotatable disc 225 are misaligned from the openings 240 in nonrotatable discs 230 such that valve 145 is closed. Ball 525 is clear of vent port 515 such that a flow path through vent port 515 to casing annulus 155 is unobstructed. FIG. 6B illustrates valve 145 when pump 140 is first turned on, for example initially turned on or restarted after a shutdown. Since pump 140 becomes operational, production fluid 600 begins to flow upward into and/or through valve 145. Since openings 240 are misaligned and vent port 515 is open, production fluid 600 flows upward passed impeller 260 and outward into casing annulus 155 through open vent port 515. The downstream flow past impeller 260 and/or the flow of production fluid 600 through vent port 515 may create torque on independent shaft 210, rotatable plate 225 and/or cause valve shaft 210 to rotate. In FIG. 6C, shaft 210 and/or rotatable disc 225 has turned to open valve 145 and cause vent port 515 to be blocked. Ball 525 is shown blocking vent port 515 and openings 240 are aligned, allowing production fluid 600 to flow upwards through production tubing 130 to surface 150.

Figure 7C:
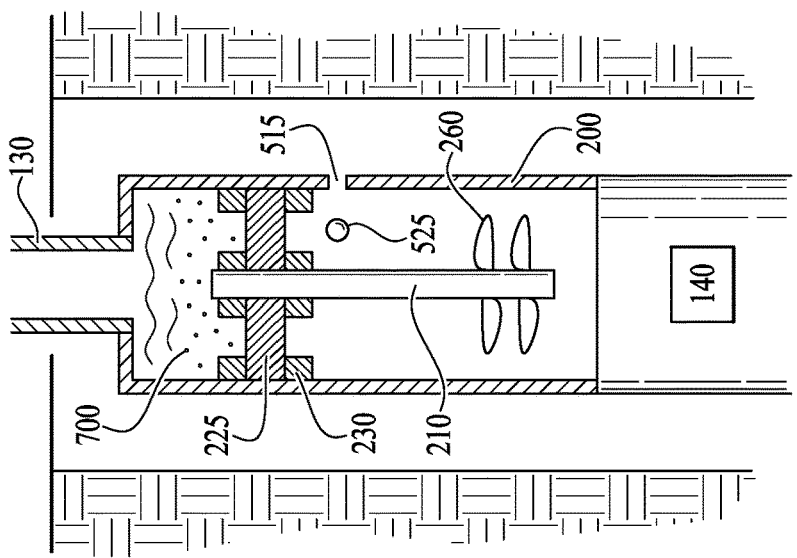
FIGS. 7A-7C are schematic diagrams of a fallback valve of an illustrative embodiment during shutdown of fluid flow.
Figure 7B:
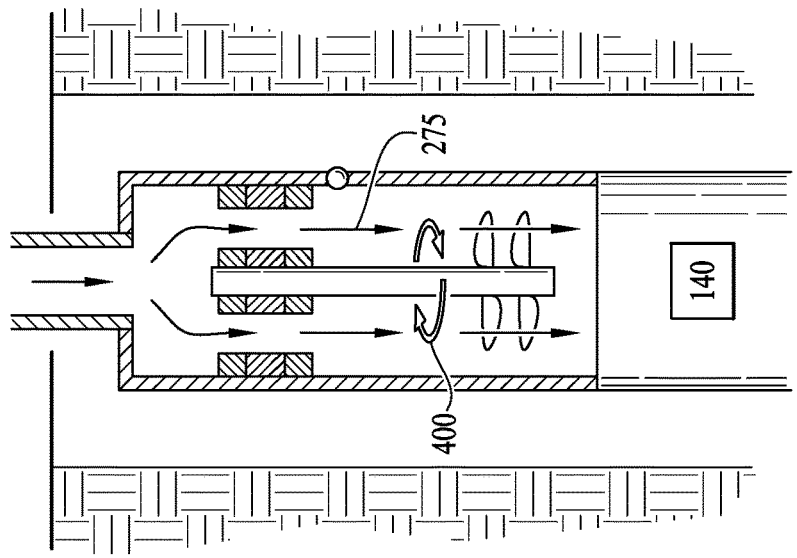
Figure 7A:
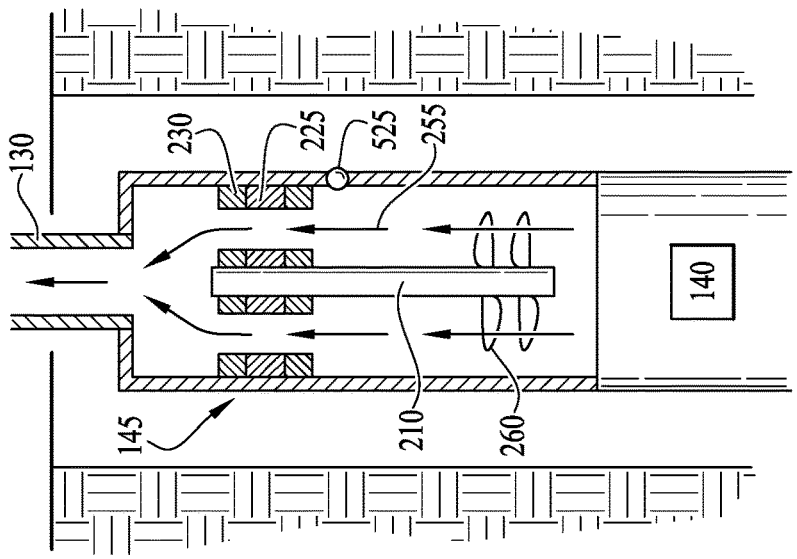

FIGS. 7A-7C show a schematic representation of the fluid-flow initiated actuation of valve 145 of illustrative embodiments where valve 145 starts in an open state and moves into a closed position to prevent and/or reduce fallback, for example as may occur during shutdown of ESP assembly 100. FIG. 7A shows valve 145 while pump 140 is turned on, valve 145 is open, and vent port 515 is closed. Openings 240 in rotatable disc 225 are aligned with the openings 240 in nonrotatable discs 230, and ball 525 is blocking vent port 515, allowing production fluid 600 to follow downstream flow path 255 upward through valve 145 to be produced to surface 150. FIG. 7B illustrates the initial position of valve 145 once pump 140 is initially turned off, stops and/or shuts down after pump 140 has previously been lifting fluid. Since pump 140 ceases to operate but valve 145 is still open, production fluid 600 initially falls downward along upstream flow path 275 through valve 145. The downward flow of fluid causes valve shaft 210 to rotate. The rotation of shaft 210 causes the openings 240 in rotatable disc 225 to misalign from the openings 240 in nonrotatable discs 230, and ball 525 is moved away from a blocking position to open vent port 515. Initial fallback may rotate valve shaft 210 in the opposite direction as upward flowing production fluid 600. Since valve 145 closes, production fluid 600 may be prevented from further downward flow, which may protect pump 140 from the detrimental effects of fallback. FIG. 7C illustrates a closed valve 145 and an open vent port 515. Once valve 145 is closed, sand 700 may accumulate above stack of discs 220, but the sand 700 accumulation may not hinder actuation of valve 145, and sand 700 may be flushed out with production fluid 600 once pump 140 restarts.

Figure 9:
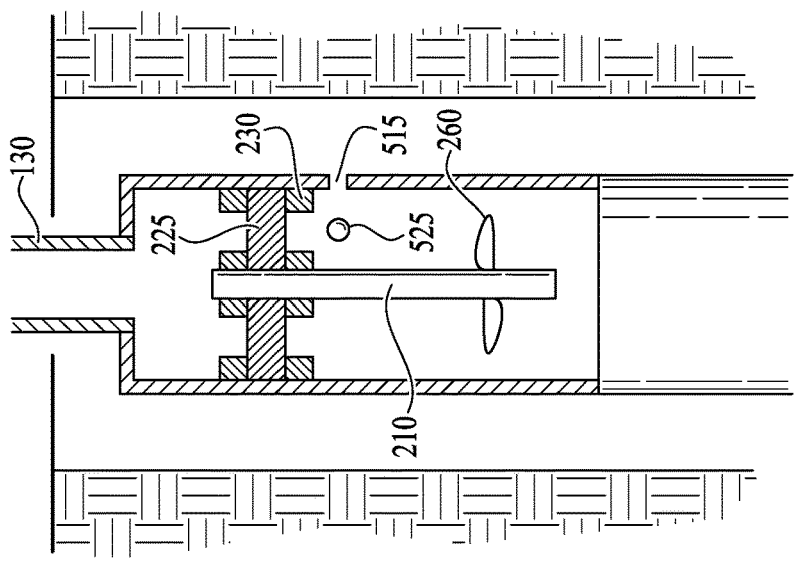
FIG. 9 is a schematic diagram of a fallback valve of an illustrative embodiment when an exemplary ESP is shutdown.
Figure 8B:
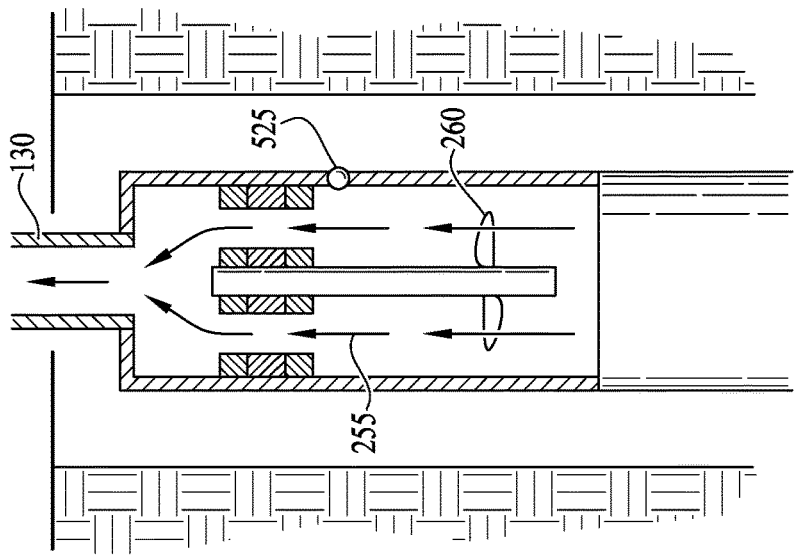
FIGS. 8A-8B are schematic diagrams of a fallback valve of an illustrative embodiment during exemplary pump operation.
Figure 8A:
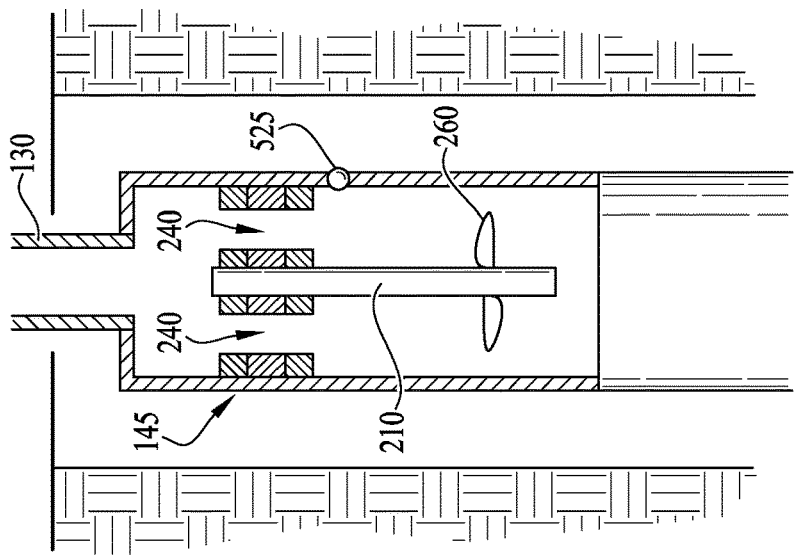

FIGS. 8A-8B illustrate an exemplary operating condition of valve 145 when ESP assembly 100 and/or pump 140 is on. Production fluid 600 may flow through valve 145 and vent port 515 may be closed. FIG. 9 illustrates an exemplary closed condition of valve 145 when ESP assembly 100 and/or pump 140 is off. Valve 145 may be closed and vent port 515 may be open. As used herein, a "closed valve" and an "open valve" refer to the position of discs 225, 230 and/or the alignment or misalignment of openings 240, and not to vent port 515. In illustrative embodiments, when valve 145 is open, vent port 515 may be closed, and vice versa. Those of skill in the art will appreciate that valve shaft 210 may not be or coupled to any other shaft in ESP assembly 100. The uncoupled nature of shaft 210 may allow rotation responsive to flow of production fluid despite whether pump 140 is turned on or off and/or regardless of the existence or direction of rotation of the ESP drive shaft. In some embodiments, a plurality of valves 145 may be included along tubing 130 and/or ESP assembly 100. The location and number of valves 145 may be determined based on operational and/or environmental conditions including flow rate of production fluid, sand content in the well, and/or speed of pump 140.

A fallback prevention valve apparatus, system and method has been described. Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the scope and range of equivalents as described in the following claims. In addition, it is to be understood that features described herein independently may, in certain embodiments, be combined.

The invention claimed is:

1. An electric submersible pump (ESP) fallback prevention system comprising:
   a fallback valve configured to be placed between a discharge of a centrifugal pump of a ESP assembly and production tubing of the ESP assembly;
   the fallback valve actuatable by a flow of fluid passing at least partially through the fallback valve, the fallback valve actuatable between:
   an open position, wherein fluid flowing into the fallback valve in a first direction away from the centrifugal pump actuates the fallback valve into the open position; and
   a closed position, wherein fluid flowing into the fallback valve in a second direction towards the centrifugal pump actuates the fallback valve into the closed position, the closed position configured to block sand carried by the fluid from entering the centrifugal pump,
   wherein the fallback valve comprises a rotatable disc, and a bottom face of the rotatable disc comprises a relief groove, wherein the rotatable disc is positioned between a pair of nonrotatable discs, and wherein the rotatable disc is rotatable with the valve shaft between the open position and the closed position.

2. The ESP fallback prevention system of claim 1, wherein the fallback valve comprises a set of discs, each disc of the set of discs having openings, wherein the openings of each disc are aligned when the fallback valve is in an open position and the openings of a first disc of the set of discs are unaligned with the openings of a second disc of the set of discs when the fallback valve is in a closed position, and wherein the rotatable disc and the pair of nonrotatable discs are discs of the set of discs.

3. The ESP fallback prevention system of claim 2, wherein the set of discs are stacked around a valve shaft, the valve shaft rotatable independently from a shaft of the centrifugal pump, and an impeller coupled to the valve shaft turns the valve shaft to actuate the first disc between the open position and the closed position.

4. The ESP fallback prevention system of claim 3, wherein the first disc rotates with respect to the second disc to actuate the set of discs, and a stopper system limits rotation of the first disc to less than a full rotation.

5. The ESP fallback prevention system of claim 3, wherein the
   impeller is secured to the valve shaft such that the shaft and the impeller rotate together.

6. The ESP fallback prevention system of claim 5,
   wherein the series of openings of the rotatable disc are aligned with the series of openings of each of the pair of nonrotatable discs in the open position; and
   wherein the openings of the rotatable disc are dispersed between the openings of the each of the pair of nonrotatable discs in the closed position.

7. The ESP fallback prevention system of claim 6, wherein the impeller rotates the valve shaft to turn the rotatable disc.

8. The ESP fallback prevention system of claim 7, wherein fluid flowing downstream passed the at least one impeller turns the valve shaft in a rotation of a first type that rotates the rotatable disc to the open position.

9. The ESP fallback prevention system of claim 8, wherein fluid flowing upstream passed the at least one impeller turns the valve shaft in a rotation of a second type opposite the first type that rotates the rotatable disc into the closed position.

10. The ESP fallback prevention system of claim 1, wherein the fallback valve further comprises a vent port extending through a housing of the fallback valve, the vent port configured to vent fluid from inside the fallback valve into a casing annulus when the vent port is open, wherein the vent port is configured to be open when the fallback valve is in the closed position, and the vent port is configured to be closed when the fallback valve is in the open position.

11. The ESP fallback prevention system of claim 10, wherein when the fallback valve is in the closed position the relief groove is fluidly coupled to the vent port and the relief groove is configured to guide production fluid outward along the rotatable disc to at least partially actuate the valve into the open position.

12. The ESP fallback prevention system of claim 11, wherein the relief groove is fluidly coupled to a depression on the bottom face of the rotatable disc, and when the fallback valve is in the closed position, the depression is aligned with an opening of a first nonrotatable disc of the pair of non-rotatable discs, the first nonrotatable disc positioned between the bottom face of the rotatable disc and the centrifugal pump.

13. The ESP fallback prevention system of claim 12, further comprising a second nonrotatable disc of the pair of non-rotatable discs opposite a top face of the rotatable disc, the nonrotatable disc and the second nonrotatable disc each comprising an outer diameter sealed to the housing.

14. A fallback prevention method comprising: utilizing a potential energy of a column of production fluid to actuate a fallback valve coupled to production tubing of an electric submersible pump (ESP), wherein the column of production fluid moving upstream closes the fallback valve and the column of production fluid moving downstream opens the fallback valve; and preventing sand from falling into the ESP with the closed valve when the ESP shuts down; and using downstream flow of production fluid to both open the fallback valve and close a leak path, wherein the downstream flow of production fluid continues flowing outward through the leak path and into a casing annulus to rotate a valve shaft and open the fallback valve.

15. The fallback prevention method of claim 14, further comprising using upstream flow of production fluid to both close the fallback valve and open the leak path to the casing annulus of the ESP.

16. The fallback prevention method of claim 15, wherein the upstream flow of production fluid rotates an s valve haft to close the fallback valve.

17. The fallback prevention method of claim 14, comprising closing the leak path by moving a ball to block a vent port in a housing of the fallback valve.

18. An electric submersible pump (ESP) fallback prevention system comprising:
an ESP assembly positioned in a downhole well, the ESP assembly comprising production tubing extending between a centrifugal pump and a surface of the downhole well such that during operation of the ESP assembly production fluid flows upward from the centrifugal pump through the production tubing to the surface;
the production tubing comprising a fallback valve actuatable by the flow of production fluid, the fallback valve actuatable between:
an open position, wherein production fluid flowing upward through the fallback
valve actuates the fallback valve into the open position, and
a closed position, wherein production fluid flowing downward through the fallback valve actuates the fallback valve into the closed position, the closed position blocking sand carried by the production fluid from falling into the centrifugal pump,
wherein the fallback valve comprises a rotatable disc, and a bottom face of the rotatable disc comprises a relief groove, wherein the rotatable disc is positioned between a pair of nonrotatable discs, and wherein the rotatable disc is rotatable with the valve shaft between the open position and the closed position.

* * * * *